(12) United States Patent
Mahadevan et al.

(10) Patent No.: US 9,553,812 B2
(45) Date of Patent: Jan. 24, 2017

(54) INTEREST KEEP ALIVES AT INTERMEDIATE ROUTERS IN A CCN

(71) Applicant: Palo Alto Research Center Incorporated, Palo Alto, CA (US)

(72) Inventors: Priya Mahadevan, Sunnyvale, CA (US); Glenn C. Scott, Los Altos, CA (US); Marc E. Mosko, Santa Cruz, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 119 days.

(21) Appl. No.: 14/481,707

(22) Filed: Sep. 9, 2014

(65) Prior Publication Data

US 2016/0072715 A1    Mar. 10, 2016

(51) Int. Cl.
| | | |
|---|---|---|
| *H04L 12/26* | (2006.01) | |
| *H04L 12/855* | (2013.01) | |
| *H04L 12/751* | (2013.01) | |
| *H04L 12/841* | (2013.01) | |
| *H04L 29/08* | (2006.01) | |

(52) U.S. Cl.
CPC ......... *H04L 47/2466* (2013.01); *H04L 45/026* (2013.01); *H04L 47/286* (2013.01); *H04L 67/145* (2013.01); *H04L 67/327* (2013.01)

(58) Field of Classification Search
None
See application file for complete search history.

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| CN | WO 2014019450 A1 * | 2/2014 | ....... G06F 17/30867 |
|---|---|---|---|
| CN | 2833581 A1 * | 2/2015 | ....... G06F 17/30867 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Otis L Thompson, Jr.
(74) *Attorney, Agent, or Firm* — Shun Yao; Park, Vaughan, Fleming & Dowler LLP

(57) ABSTRACT

One embodiment provides a system that facilitates an intermediate node to handle a potential timeout event. During operation, the system receives, by an intermediate node, a keep-alive control packet which indicates a name for an Interest message, an indicator to keep alive a Pending Interest Table (PIT) entry, and a time period for which to keep the PIT entry alive. The intermediate node determines whether the keep-alive control packet corresponds to the PIT entry based on the name, and, responsive to determining that the keep-alive control packet corresponds to the PIT entry, updates a timeout value of the PIT entry based on the time period indicated in the keep-alive control packet. Responsive to determining one or more interfaces specified in the PIT entry from which the Interest message is received, the intermediate node forwards the keep-alive control packet to the one or more interfaces.

25 Claims, 8 Drawing Sheets

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,363,067 B1 * | 3/2002 | Chung ............... H04L 49/9089 370/364 |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0188020 A1 * | 8/2005 | Avritch ............... G06Q 10/107 709/206 |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |

(56) References Cited

U.S. PATENT DOCUMENTS

| | | | |
|---|---|---|---|
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0229024 A1* | 9/2008 | Plamondon ............ H04L 67/28 711/126 |
| 2008/0229025 A1* | 9/2008 | Plamondon ......... G06F 12/0862 711/126 |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0172182 A1* | 7/2009 | Yoon ..................... H04L 65/80 709/231 |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1* | 8/2010 | Jacobson ............. H04L 45/748 370/392 |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0131308 A1* | 6/2011 | Eriksson ................ H04L 67/14 709/223 |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |

(56) References Cited

U.S. PATENT DOCUMENTS

| | | |
|---|---|---|
| 2012/0198048 A1 | 8/2012 | Ioffe |
| 2012/0221150 A1 | 8/2012 | Arensmeier |
| 2012/0221810 A1* | 8/2012 | Shah .................. G06F 13/16 |
| | | 711/158 |
| 2012/0224487 A1 | 9/2012 | Hui |
| 2012/0256009 A1* | 10/2012 | Mucignat ........... G05D 23/1905 |
| | | 236/1 C |
| 2012/0257500 A1 | 10/2012 | Lynch |
| 2012/0257560 A1* | 10/2012 | Srinivasan ............. H04W 4/18 |
| | | 370/312 |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0128786 A1* | 5/2013 | Sultan ............... H04W 52/0238 |
| | | 370/311 |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304867 A1* | 11/2013 | Raman ................ H04L 67/1027 |
| | | 709/219 |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1* | 6/2014 | Kim .................... H04L 65/4084 |
| | | 709/204 |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1* | 9/2014 | Varvello ............... H04L 67/327 |
| | | 709/223 |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0139166 A1* | 5/2015 | Yao .................... G06F 17/30867 |
| | | 370/329 |
| 2015/0188770 A1 | 7/2015 | Naiksatam |
| 2015/0312373 A1* | 10/2015 | Muramoto ........... H04L 47/283 |
| | | 370/238 |

FOREIGN PATENT DOCUMENTS

| | | |
|---|---|---|
| DE | 1720277 A1 | 6/1967 |
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/.downloaded Mar. 11, 2015.

(56) References Cited

OTHER PUBLICATIONS

"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
B. Lynn$2E.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boner, C. Gentry, and B. Waters, 'Collusi.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," Parc, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer to-Peer Overlays." NSDI. vol. 4. 2004.
H. Xiong, X. Zhang, W. Zhu, and D. Yao. CloudSeal: End-to$2.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication

(56) References Cited

OTHER PUBLICATIONS paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer ScienceVolume 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2019.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.

(56) References Cited

OTHER PUBLICATIONS

Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE Infocom 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hogue et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.

\* cited by examiner

INTEREST KEEP ALIVES AT INTERMEDIATE ROUTERS IN A CCN

RELATED APPLICATION

The subject matter of this application is related to the subject matter in the following applications:
- U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814"); and
- U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

the disclosures of which are herein incorporated by reference in their entirety.

BACKGROUND

Field

This disclosure is generally related to distribution of digital content. More specifically, this disclosure is related to providing notification by a content producing device to intermediate routers of a potential timeout event in order to keep an Interest alive in a content centric network (CCN).

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending Interest packets for various content items and receiving Content Object packets in return. CCN Interests and Content Objects are identified by their unique names, which are typically hierarchically structured variable length identifiers (HSVLI). An HSVLI can include contiguous name components ordered from a most general level to a most specific level. As an Interest packet is routed through the network from a content requesting node to a content producing node, each intermediate CCN router adds an entry in its Pending Interest Table (PIT) corresponding to the Interest and forwards the Interest to the next CCN router. When a matching Content Object packet is sent from the content producing node back to the requesting node, it follows the reverse path of the Interest. Each intermediate CCN router forwards the Content Object along the requesting interfaces listed in the corresponding PIT entry and subsequently removes the PIT entry, indicating that the Interest has been fulfilled.

A PIT entry can also be removed by a CCN node (or router) when the PIT entry times out. A node can select any time out value that the node deems appropriate upon adding an Interest to its PIT. PIT entries can time out under different scenarios. One case is due to congestion in the network, which results in the system dropping the Interest or the matching Content Object. Another case is when the content producing node or application responsible for generating the matching Content Object needs to perform a computationally intensive task (e.g., that takes 45 seconds) before it can send a response back. In both cases, PIT entry timeouts can lead to the requesting node re-expressing the Interest, sometimes repeatedly and over a short period of time. PIT entry timeouts can also cause intermediate CCN routers to transmit the re-expressed Interests on multiple interfaces, thus increasing network traffic and creating additional congestion.

SUMMARY

One embodiment provides a system that facilitates an intermediate node to handle a potential timeout event. During operation, the system receives, by an intermediate node, a keep-alive control packet which indicates a name for an Interest message, an indicator to keep alive a Pending Interest Table (PIT) entry, and a time period for which to keep the PIT entry alive. The intermediate node determines whether the keep-alive control packet corresponds to the PIT entry based on the name, and, responsive to determining that the keep-alive control packet corresponds to the PIT entry, updates a timeout value of the PIT entry based on the time period indicated in the keep-alive control packet. Responsive to determining one or more interfaces specified in the PIT entry from which the Interest message is received, the intermediate node forwards the keep-alive control packet to the one or more interfaces, thereby facilitating the intermediate node to handle a potential timeout event.

In some embodiments, responsive to determining that no time period is indicated in the keep-alive control packet, the intermediate node updates the timeout value of the PIT entry based on one or more of: a predetermined value; and a predetermined value which is dynamically adjusted by routers based on network conditions.

In some embodiments, the intermediate node receives a Content Object in response to the Interest and removes the PIT entry corresponding to the name for the Interest.

In some embodiments, determining whether the keep-alive control packet corresponds to the PIT entry is further based on a matching criteria, and the keep-alive control packet further indicates that the matching criteria is one or more of: a key identifier associated with a content producing node; a hash value of a Content Object corresponding to the Interest; and a summary of the Interest.

In some embodiments, the intermediate node receives a predetermined number for entries in the PIT for a name prefix, where the name prefix comprises one or more name components of a hierarchically structured variable length identifier (HSVLI). Responsive to determining that the predetermined number of entries for the name prefix has been reached, the intermediate node times out additional PIT entries with the same name prefix.

Another embodiment provides a system that facilitates handling of a potential timeout event. During operation, the system generates, by a content producing node, a keep-alive control packet which indicates a name for an Interest message, an indicator to keep a Pending Interest Table (PIT) entry corresponding to the name alive, and a time period for which to keep the PIT entry alive. The content producing node transmits the keep-alive control packet to an intermediate node, thereby facilitating handling of a potential timeout event.

In some embodiments, the keep-alive control packet generated by the content producing node further indicates one or more of: a key identifier associated with the content producing node; a hash value of a Content Object corresponding to the Interest; and a summary of the Interest message.

In some embodiments, the content producing node generates a Content Object in response to the Interest.

In some embodiments, the content producing node computes a hashcash value and includes the computed hashcash value in the keep-alive control packet, where the hashcash computation becomes progressively more complex each time the computation is performed.

In some embodiments, the system allows a virtual connection provided by an Internet Service Provider between the content producing node and a content requesting node to be maintained based on the keep-alive control packet.

In some embodiments, the content producing node receives a predetermined number of tokens from an upstream node, where a token corresponds to a time period for which to keep alive a PIT entry in the content producing node. The content producing node consumes a token in exchange for generating the keep-alive control packet, where the time period for which to keep the PIT entry alive is the time period corresponding to the token.

In some embodiments, receiving a predetermined number of tokens is based on one or more of: purchase of one or more tokens by the content producing node from an Internet Service Provider; reputation of the content producing node; historical behavior of the content producing node; and any other technique.

In some embodiments, the system removes a token based on negative behavior of the content producing node.

In some embodiments, the negative behavior includes abuse of the upstream node.

BRIEF DESCRIPTION OF THE FIGURES

In the figures, like reference numerals refer to the same figure elements.

DETAILED DESCRIPTION

Figure 1:
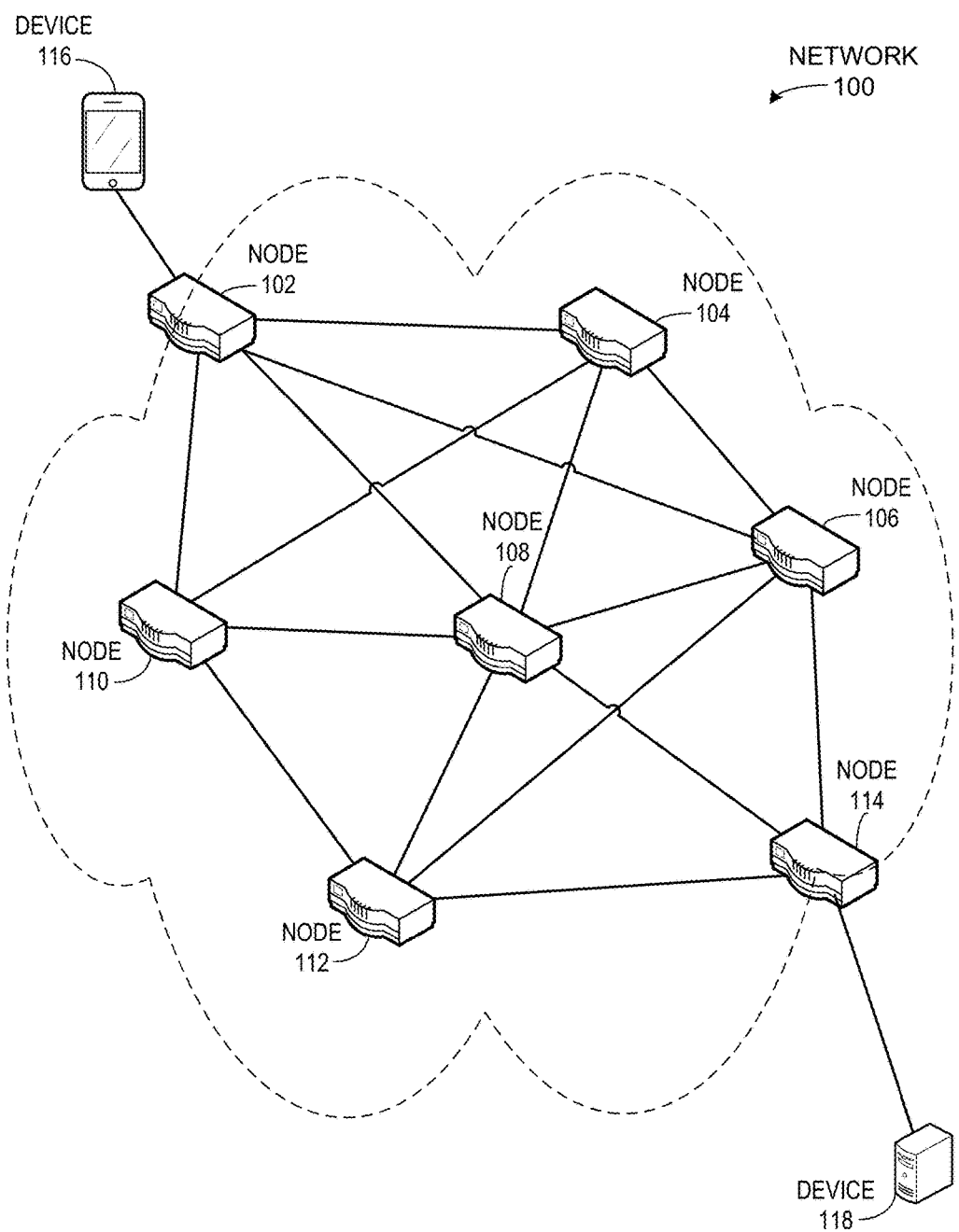
FIG. 1 illustrates an exemplary network that facilitates an intermediate node to handle a potential timeout event, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which facilitates handling a potential timeout event when a content producing device (e.g., a server) requires additional time to generate a matching Content Object in response to an Interest from a content requesting device (e.g., a client). During operation, a content producer receives an Interest message from a content requester and determines that additional time is required to generate the matching Content Object. The content producer notifies the intermediate routers by sending a keep-alive control packet which indicates that a corresponding entry in the Pending Interest Table (PIT) of each intermediate router is to be kept alive for a certain amount of time. The keep-alive control packet includes the same name as the Interest, an indicator that the control packet is a "keep-alive" message, and a time period corresponding to how long the intermediate router is to continue storing the entry in its PIT. The intermediate router adds the indicated time period to the timeout value for the PIT entry. If no value is specified for the time period, the system uses a predetermined default value. The intermediate router then forwards the keep-alive control packet to all of the interfaces specified in the corresponding PIT entry, e.g., all of the interfaces that previously forwarded the Interest message. In this manner, the keep-alive control packet is propagated through the network to all of the intermediate routers along the paths which the Interest has previously been transmitted.

Intermediate CCN routers keep track of the computation progress of the content producer by maintaining the state associated with the Interest for the duration of the computation time required by the content producer to generate the responsive Content Object. Thus, the Interest is "kept alive" through notification to the intermediate routers in the form of keep-alive control packets and subsequent updates to the corresponding PIT entries of all intermediate routers in the path of the Interest. This solution reduces the amount of unnecessary PIT entry timeouts and frees PIT spaces, which in turn reduces network congestion by reducing the number of re-expressed Interests transmitted and pending in a CCN.

In CCN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms are used to describe the CCN architecture:

Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175.

Exemplary Network and Communication

FIG. 1 illustrates an exemplary network 100 that facilitates an intermediate node to handle a potential timeout event, in accordance with an embodiment of the present invention. Network 100 can include a content requesting device 116, a content producing device 118, and a router or other forwarding device at nodes 102, 104, 106, 108, 110, 112, and 114. A node can be a computer system, an end-point representing users, and/or a device that can generate Interests or originate content. A node can also be an edge router (e.g., CCN nodes 102 and 114) or a core router (e.g., intermediate CCN routers 104-112).

For example, content requesting device 116 can generate an Interest in a piece of content. Network 100 routes the Interest to CCN router 102, which adds an entry in its pending Interest table (PIT) and forwards the Interest to intermediate CCN router 110. Each CCN router that receives the Interest performs the same actions, adding an entry in its PIT and forwarding the Interest to the interfaces specified by a Forwarding Information Base (FIB) of the router. For example, the FIB of CCN router 102 can specify that the Interest is to be forwarded on to interfaces at nodes 108 and 110, where an Interest forwarded through node 110 travels from node 102 to nodes 110, 112, and 114, while an Interest forwarded through node 108 travels from node 102 to nodes 108 and 114. Subsequently, CCN router 114 adds an entry in its PIT (including an indication that the Interest was received on interfaces corresponding to nodes 108 and 112) and forwards the Interest to content producing device 118. Device 118 determines that additional computation time is required to generate the matching Content Object and sends a keep-alive control packet to its CCN forwarder (CCN router 114). The keep-alive control packet indicates a time period for which CCN router 114 is to continue storing the corresponding PIT entry. The keep-alive control packet can also include a name which is the same as the Interest and an indicator that the control packet is a "keep-alive" message. CCN router 114 updates its PIT entry by adding the indicated time period to a timeout value and forwards the keep-alive control packet to all of the interfaces specified for the PIT entry (e.g., interfaces corresponding to nodes 108 and 112). For example, the keep-alive control packet travels from node 114 to nodes 108 and 102, and also from node 114 to nodes 112, 110, and 102. Each intermediate node that receives the keep-alive control packet performs the same actions as router 114: updating the PIT entry timeout value and forwarding to all specified interfaces.

Content producing device 118 can send multiple keep-alive control packets for the same Interest. For example, content producing device 118 can first send a keep-alive control packet indicating a 20 second time period and then determine that additional time is required to generate the responsive Content Object. Device 118 can subsequently send an updated keep-alive control packet indicating, e.g., a 30 second time period. When content producing device 118 has completed the computation required to generate the responsive Content Object, device 118 transmits the matching Content Object to content requesting device 116 back along the same path in the reverse direction. Each intermediate router again forwards the matching Content Object to the previous hop node in the reverse data path and removes the corresponding PIT entry.

Figure 2:
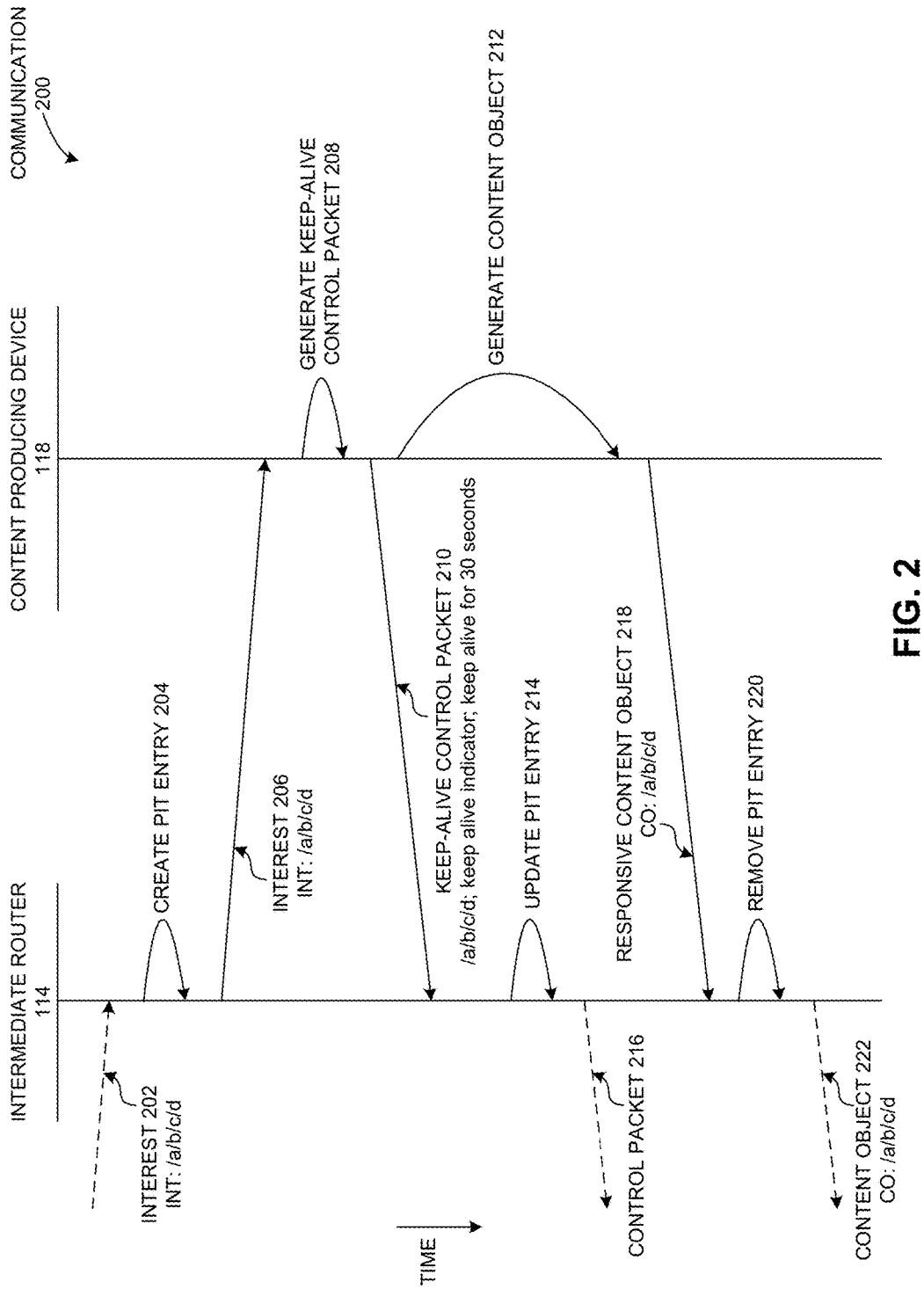
FIG. 2 illustrates exemplary communication between an intermediate node and a content producing node, in accordance with an embodiment of the present invention.

FIG. 2 illustrates exemplary communication between an intermediate node (e.g., intermediate CCN router 114 in FIG. 1) and a content producing node (e.g., content producing device 118 in FIG. 1), in accordance with an embodiment of the present invention. The vertical lines beneath intermediate node 114 and content producing node 118 indicate passage of time. During operation, intermediate router 114 receives an Interest with a name of "/a/b/c/d" (operation 202) and creates an entry in its Pending Interest Table (PIT) corresponding to the name (operation 204). In some embodiments, the Interest includes a KeyId restriction and/or a Content Object Hash restriction. The KeyId can specify a Key Identifier associated with the content producing node, and the Content Object Hash restriction can specify a hash value for a Content Object that corresponds to the Interest. When a KeyID restriction is included in the Interest, an intermediate or forwarding CCN node (e.g., intermediate router 114) forwards the Interest toward the target CCN content producing node (e.g., content producing device 118) that is associated with the KeyId. Similarly, when a Content Object Hash restriction is included in the Interest, the content producing node returns a Content Object whose hash value matches the Hash restriction.

Intermediate router 114 forwards the Interest on to content producing device 118 (operation 206). Device 118 determines that additional computation time is needed to generate the matching Content Object, and generates a keep-alive control packet (operation 208). Device 118 then transmits a keep-alive control packet to intermediate router 114 (operation 210). The keep-alive control packet indicates the same name as the Interest, an indicator that the packet is a "keep-alive" control packet, and a time period for how long a receiving intermediate CCN router is to continue to keep alive the corresponding Interest. In some embodiments, the intermediate node determines whether the keep-alive control packet corresponds to a PIT entry based on the name of the Interest or other matching criteria included in the keep-alive control packet, such as the KeyId restriction and/or the Content Object Hash restriction. The keep-alive control packet specifies the restrictions present in the Interest, and can also include a summary of the Interest, such as a SHA-256 hash of the Interest message. Upon determining that the keep-alive control packet corresponds to its PIT entry, intermediate router 114 updates its PIT entry by adding the specified time period to a timeout value (operation 214) and forwards the keep-alive control packet on as described in relation to FIG. 1 (operation 216).

Meanwhile, content producing device 118 has successfully completed generation of the Content Object matching the Interest (operation 212), so device 118 transmits a responsive Content Object back to intermediate router 114 (operation 218). Router 114 removes the corresponding PIT entry, indicating that the Interest has been fulfilled (operation 220), and forwards the responsive Content Object to the previous hop node in the reverse data path (operation 222).

Generating a Keep-Alive Control Packet

Figure 3A:
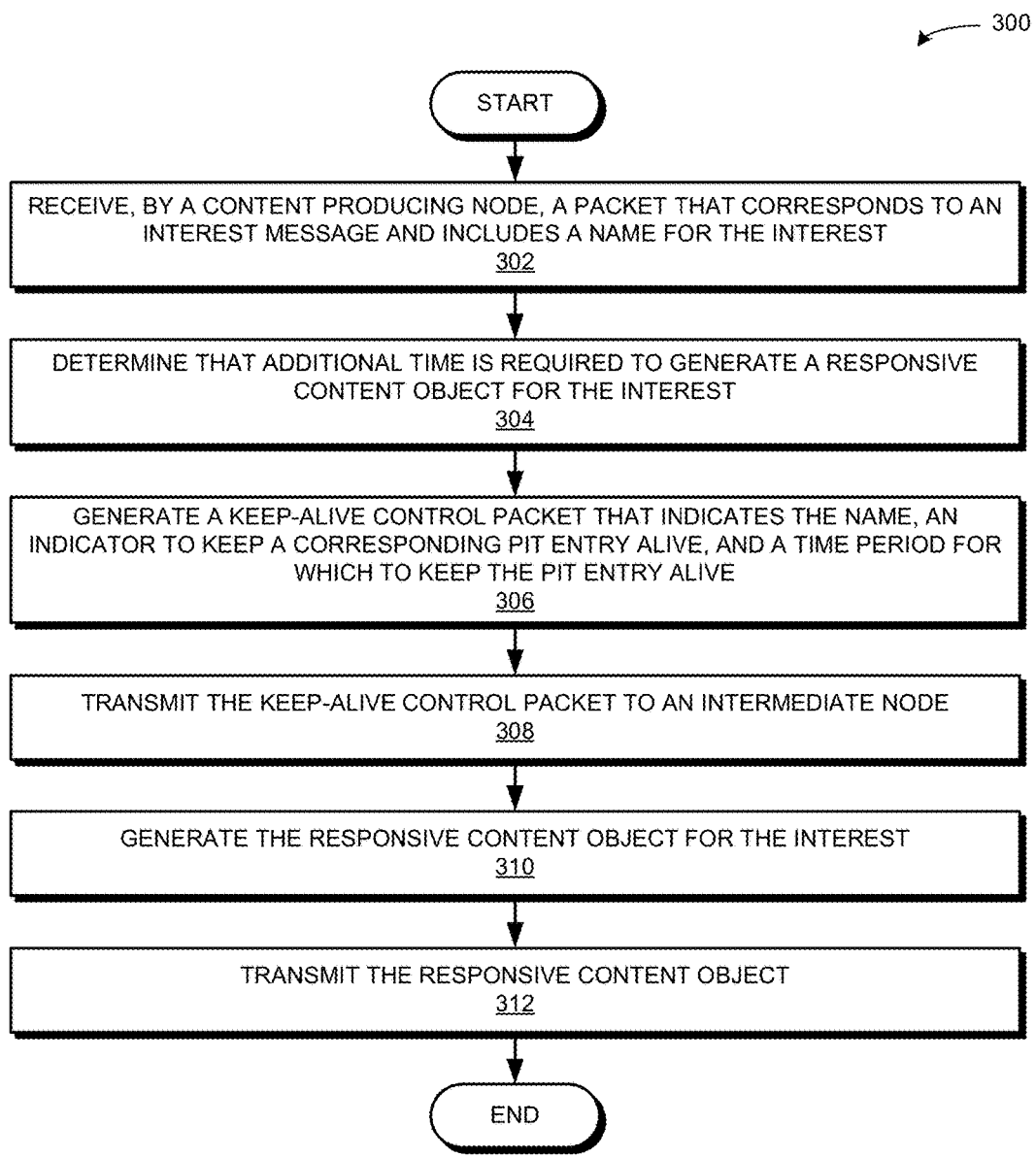
FIG. 3A presents a flow chart illustrating a method by a content producing node for processing an Interest by generating a keep-alive control packet and a matching Content Object, in accordance with an embodiment of the present invention.

FIG. 3A presents a flow chart 300 illustrating a method by a content producing node for processing an Interest by generating a keep-alive control packet and a matching Content Object, in accordance with an embodiment of the present invention. During operation, the system receives, by a content producing node, a packet that corresponds to an Interest message and includes a name for the Interest (operation 302). The content producing node determines that additional time is required to generate a Content Object in response to the Interest (operation 304) and generates a keep-alive control packet (operation 306). The keep-alive control packet indicates the same name as the Interest, an indicator to keep a corresponding PIT entry alive, and a time period for which to keep the PIT entry alive. The content producing node transmits the keep-alive control packet to an intermediate node (operation 308). The content producing node can generate and send multiple keep-alive control packets for the Interest. For example, the content producing node can generate and transmit a keep-alive control packet indicating a time period of 20 seconds. The content producing node can then determine that additional time is required to generate the corresponding Content Object, so the content producing node can generate and send an updated keep-alive control packet indicating a time period of 30 seconds. After generating the corresponding Content Object (operation 310), the content producing node transmits the Content Object to the previous hop node in the reverse data path as the Interest (operation 312).

Exemplary Congestion Mitigation Techniques by Content Producing Node

Figure 3B:
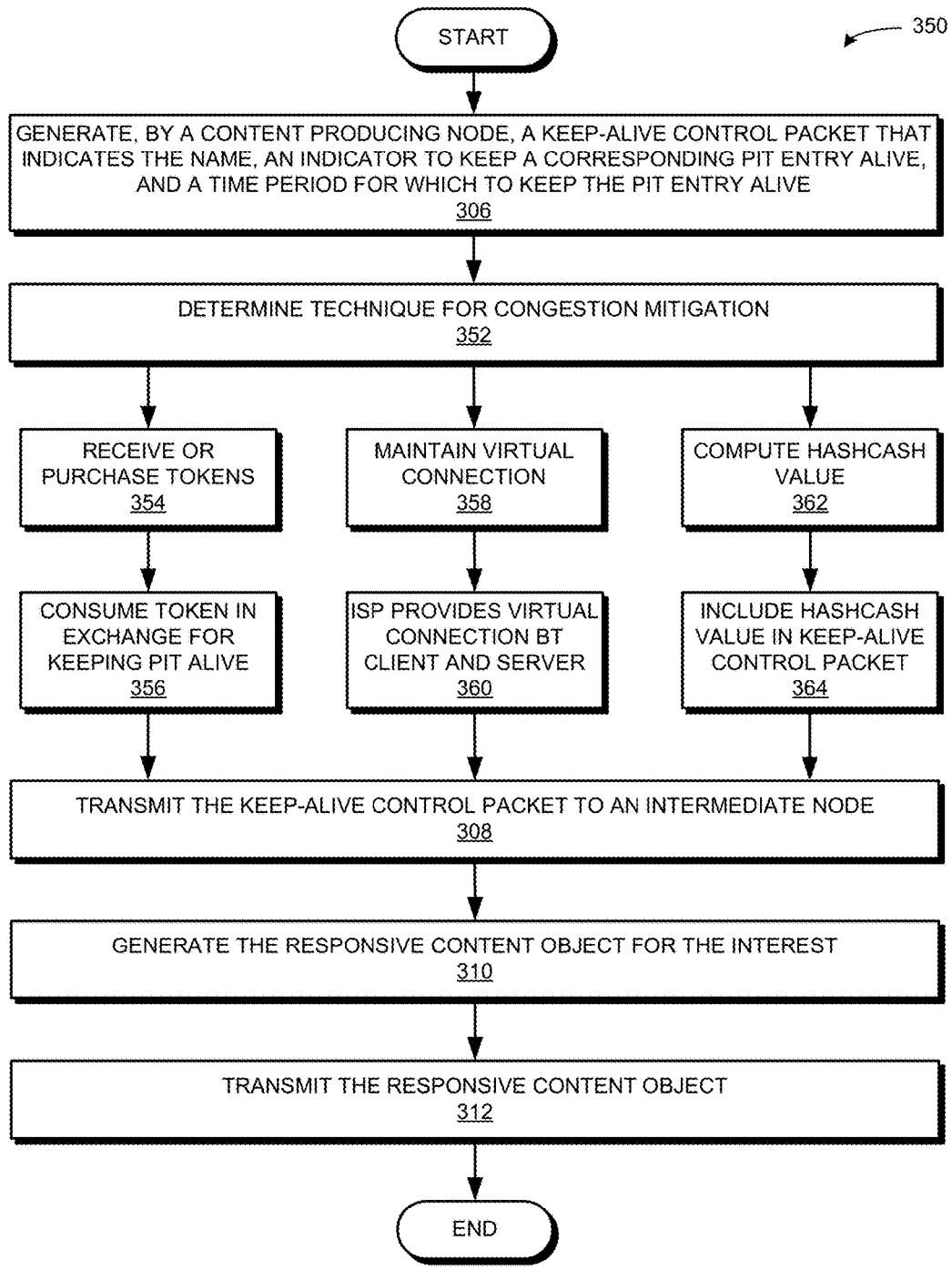
FIG. 3B presents a flow chart illustrating a method by a content producing node for applying techniques to mitigate congestion in a network, in accordance with an embodiment of the present invention.

FIG. 3B presents a flow chart 350 illustrating a method by a content producing node for applying techniques to mitigate congestion in a network, in accordance with an embodiment of the present invention. A content producing node generates a keep-alive control packet that indicates the name of an Interest, an indicator to keep a corresponding PIT entry alive, and a time period for which to keep the PIT entry alive (operation 306). The content producing node determines a congestion mitigation technique to employ (operation 352). In one embodiment, the content producing node (or an application running on a server) can receive a certain number of tokens from an upstream node (e.g., the system or an Internet Service Provider (ISP)) (operation 354). The content producing node can consume a token in exchange for more "keep alive" time for a PIT entry (operation 356). When the PIT entry times out and is subsequently deleted, the content producing node can receive the token back and exchange the token for keeping other PIT entries alive. In some embodiments, the number of tokens initially received by the content producing node can be based on the reputation of, e.g., the service at the content producing node. In addition, a content producing node can obtain additional tokens based on predetermined "good behavior" or by purchasing additional tokens from an ISP (operation 354). The token quota can also be reduced based on negative behavior of the content producing node. The token quota can also be based on current network conditions such as, e.g., traffic, available bandwidth, and congestion in the network.

In a further embodiment, the system can allow a virtual connection to be maintained (operation 358) by an Internet Service Provider (ISP) between the content producing node (e.g., a server) and a content requesting node (e.g., a client) based on the keep-alive control packet (operation 360). The ISP can charge a server or service at the content producing node based on the number of virtual connections open during a particular billing period. Additionally, virtual connections provided during peak traffic times can incur additional costs.

Optionally, the content producing node can compute a hashcash value (operation 362) and include the computed hashcash value in the keep-alive control packet (operation 364). The hashcash computation can become progressively more complex each time the computation is performed, thus providing the content producing node with a negative incentive for generating and transmitting subsequent keep-alive control packets for the same Interest. In this manner, the system mitigates network congestion by discouraging the content producing node from unnecessarily extending the lifetime of entries in the PIT.

After the various congestion mitigation techniques are employed, the content producing node transmits the keep-alive control packet to an intermediate node (operation 308). After the necessary computation has been performed, the content producing node generates the responsive Content Object (operation 310) and transmits the responsive Content Object to the previous hop node in the reverse data path as the Interest (operation 312).

Processing a Keep-Alive Control Packet

Figure 4A:
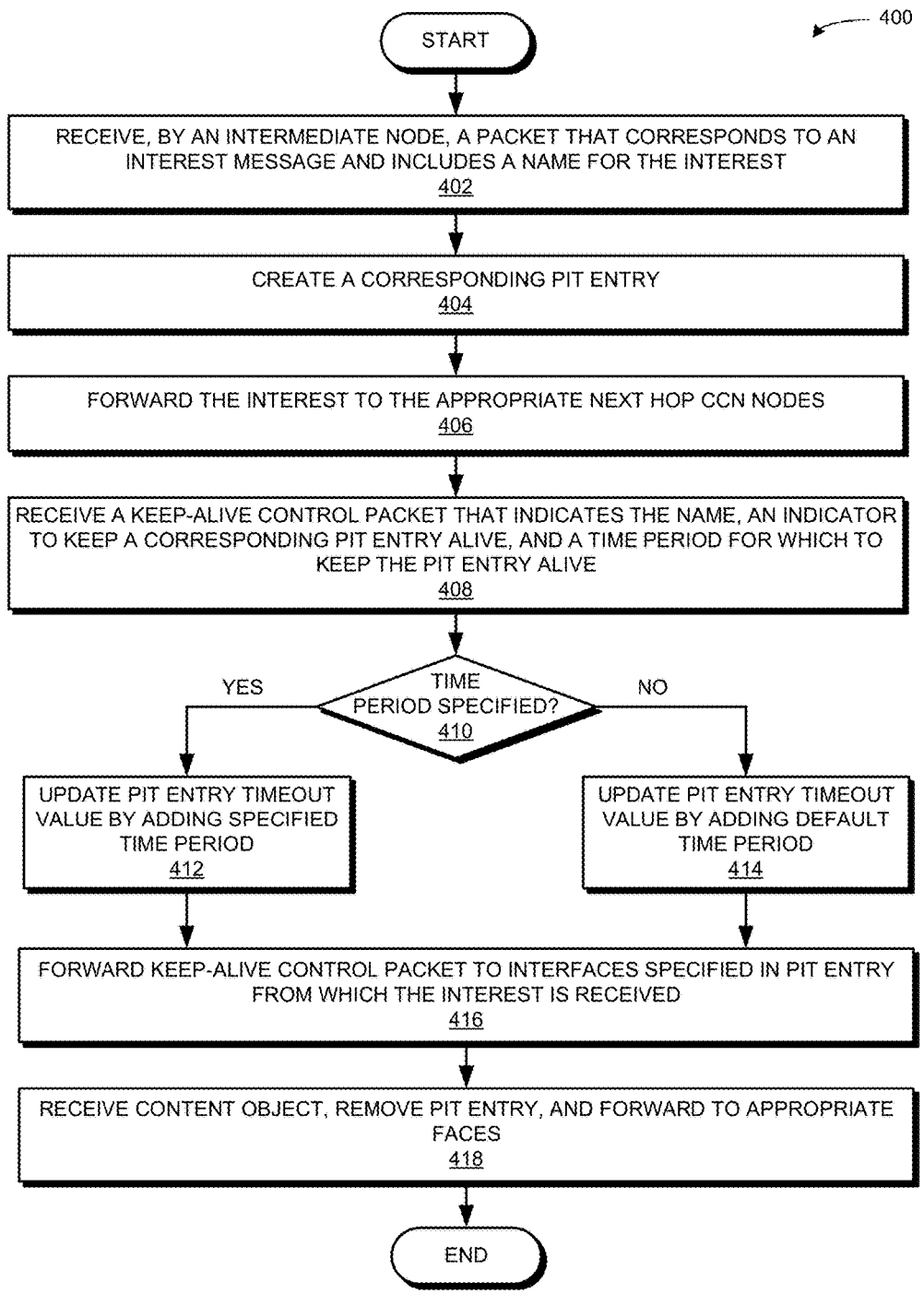
FIG. 4A presents a flow chart illustrating a method by an intermediate node for processing an Interest message and a corresponding keep-alive control packet, in accordance with an embodiment of the present invention.

FIG. 4A presents a flow chart 400 illustrating a method by an intermediate node for processing an Interest message and a corresponding keep-alive control packet, in accordance with an embodiment of the present invention. During operation, the system receives, by an intermediate node, a packet that corresponds to an Interest message and includes a name for the Interest (operation 402). The intermediate node creates a corresponding entry in its Pending Interest Table (PIT) (operation 404) and forwards the Interest to the appropriate next hop CCN nodes (operation 406). Subsequently, the intermediate node receives a keep-alive control packet that indicates the name, an indicator to keep the corresponding PIT entry alive, and a time period for which to keep the PIT entry alive (operation 408). The system determines whether a time period is specified in the keep-alive control packet (decision 410). If a time period is specified, the intermediate node updates the PIT entry by adding the specified time period to a timeout value for the PIT entry (operation 412). If a time period is not specified, the intermediate node updates the PIT entry by adding a default time period to the timeout value for the PIT entry (operation 414). In some embodiments, the default time period can be dynamically adjusted by routers based on network conditions. The intermediate node then forwards the keep-alive control packet to the interfaces specified in the PIT entry, e.g., the faces from which the Interest is received (operation 416). The intermediate node eventually receives a Content Object in response to the Interest, removes the corresponding PIT entry, and forwards the Content Object on to the appropriate previous hop nodes in the reverse data path as the Interest (operation 418).

Exemplary Congestion Mitigation Technique by Intermediate Node

Figure 4B:
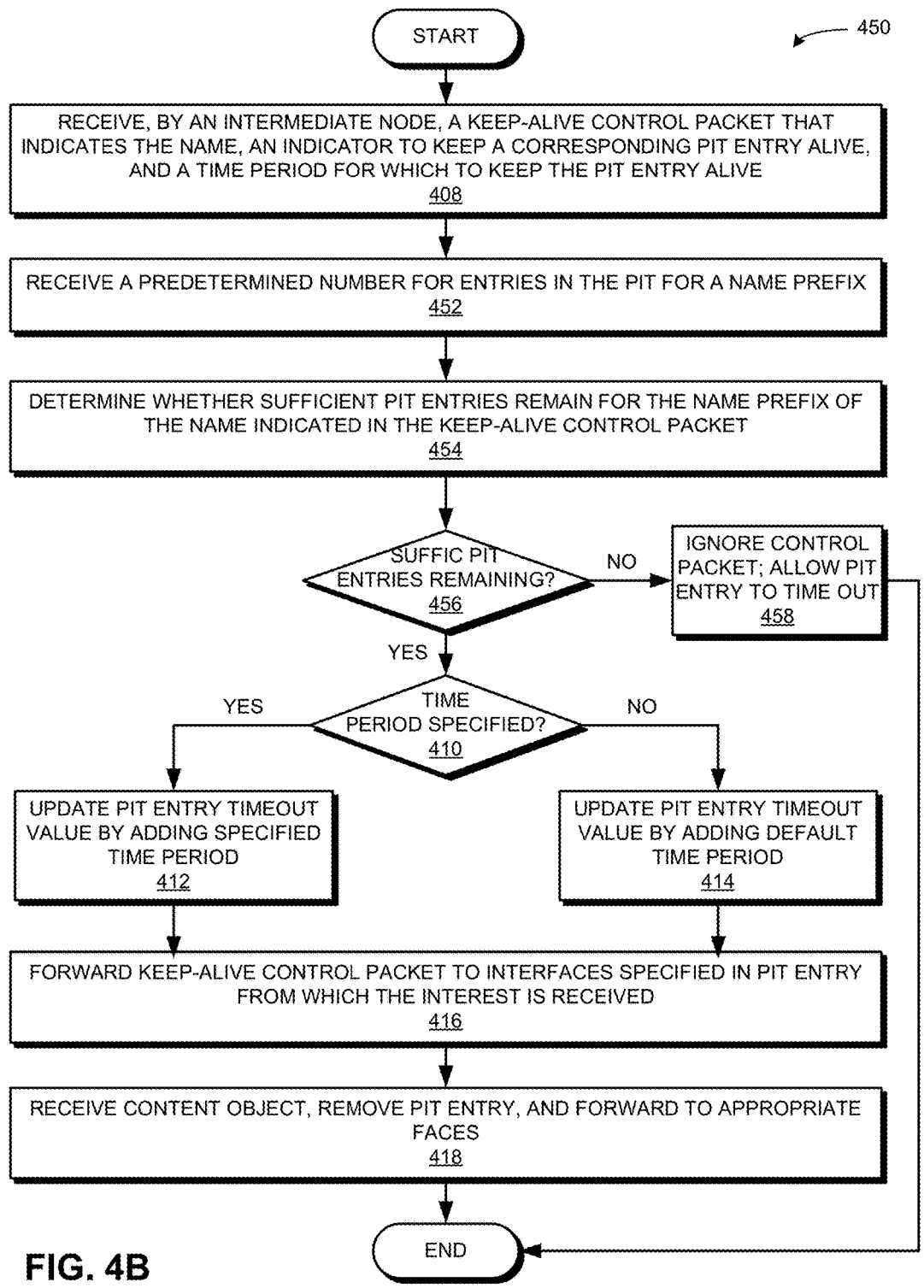
FIG. 4B presents a flow chart illustrating a method by an intermediate node for mitigating congestion in a network, in accordance with an embodiment of the present invention.

FIG. 4B presents a flow chart 450 illustrating a method by an intermediate node for mitigating congestion in a network, in accordance with an embodiment of the present invention. During operation, an intermediate node receives a keep-alive control packet (operation 408). The intermediate node receives a fixed number (e.g., 50) for entries in the PIT for a particular name prefix (operation 452). In some embodiments, the intermediate node receives the fixed number before receiving a keep-alive control packet that includes a name that corresponds to the particular name prefix. The intermediate node determines whether a sufficient number of PIT entries remain for the name prefix of the name indicated in the keep-alive control packet (operation 454). If sufficient PIT entries remain, the operation continues as described in FIG. 4A (e.g., decision 410, operations 412, 414, 416, and 418). If not, the intermediate node ignores the keep-alive control packet and allows the corresponding PIT entry to time out (operation 458). In some embodiments, the intermediate node receives the fixed number of entries for a name prefix from a content producing node, such that a server or service at a content producing node is responsible for determining which PIT entries should be stored in memory and for how long.

Exemplary Format of a Keep-Alive Control Packet and Affected PIT Entry

Figure 5A:
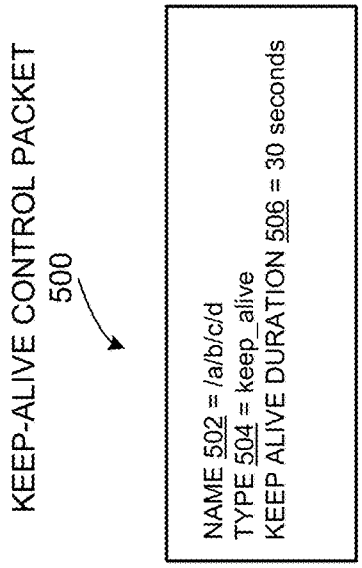
FIG. 5A illustrates an exemplary format of a keep-alive control packet generated by a content producing node and propagated through a network, in accordance with an embodiment of the present invention.

FIG. 5A illustrates an exemplary format of a keep-alive control packet 500 generated by a content producing node and propagated through a network, in accordance with an embodiment of the present invention. Keep-alive control packet 500 includes: a name 502 with a value of "/a/b/c/d"; a type 504 field with a value of "keep alive"; and a keep alive duration 506 field with a value of "30 seconds" which indicates the time duration which a corresponding PIT entry is to continue to be "kept alive."

Figure 5B:
FIG. 5B illustrates an exemplary format of a Pending Interest Table (PIT) entry at an intermediate node before and after receiving a keep-alive control packet, in accordance with an embodiment of the present invention.

FIG. 5B illustrates an exemplary format of a Pending Interest Table (PIT) entry at an intermediate node before (PIT entry 520) and after (PIT entry 540) receiving a keep-alive control packet, in accordance with an embodiment of the present invention. PIT entry 520 includes: a name 522 with a value of "/a/b/c/d" which is the same as name 502 of keep-alive control packet 500; a timeout 524 field with a value of 2 seconds; and an interfaces 526 field that includes nodes 108 and 112. After receiving keep-alive control packet 500, PIT entry 540 includes: a name 522 with a value of "/a/b/c/d"; a timeout 524 field with a value of 2+30=32 seconds; and an interfaces 526 field with the same nodes 108 and 112 as in PIT entry 520.

Exemplary Computer and Communication System

Figure 6:
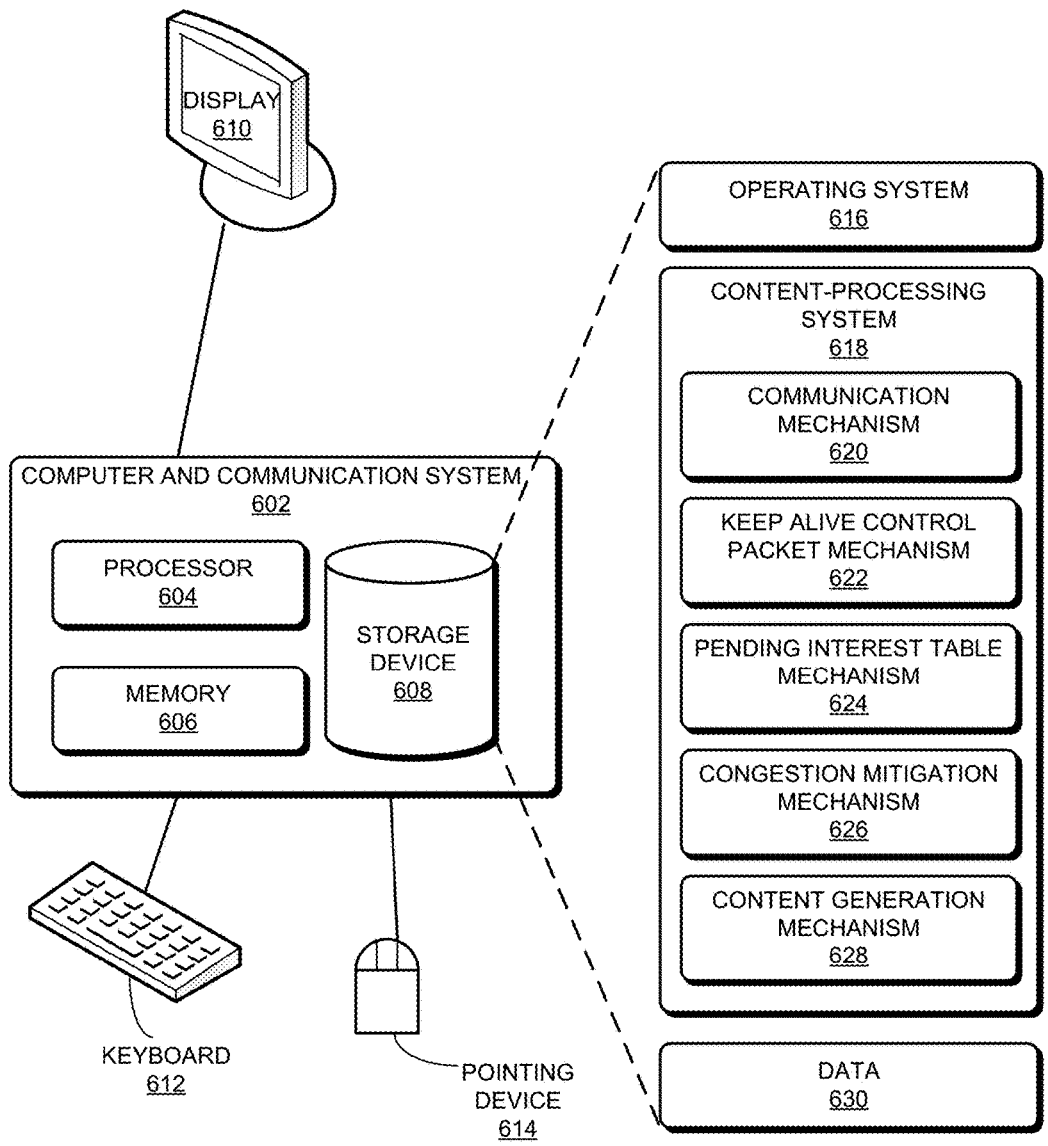
FIG. 6 illustrates an exemplary computer and communication system that facilitates handling a potential timeout event, in accordance with an embodiment of the present invention.

FIG. 6 illustrates an exemplary computer and communication system 602 that facilitates handling a potential timeout event, in accordance with an embodiment of the present invention. Computer and communication system 602 includes a processor 604, a memory 606, and a storage device 608. Memory 606 can include a volatile memory (e.g., RAM) that serves as a managed memory, and can be used to store one or more memory pools. Furthermore, computer and communication system 602 can be coupled to a display device 610, a keyboard 612, and a pointing device 614. Storage device 608 can store an operating system 616, a content-processing system 618, and data 630.

Content-processing system 618 can include instructions, which when executed by computer and communication system 602, can cause computer and communication system 602 to perform methods and/or processes described in this disclosure. Specifically, content-processing system 618 may include instructions for receiving, by an intermediate node, a keep-alive control packet which indicates a name for an Interest message, an indicator to keep alive a Pending Interest Table (PIT) entry corresponding to the name, and a time period for which to keep the PIT entry alive (communication mechanism 620). Content-processing system 618 can also include instructions for updating a timeout value of the PIT entry based on the time period indicated in the keep-alive control packet (Pending Interest Table mechanism 624). Content processing system 618 can include instructions for, responsive to determining one or more interfaces specified in the PIT entry from which the Interest message is received, forwarding the keep-alive control packet to the one or more interfaces (communication mechanism 620).

Content processing system 618 can further include instructions for, responsive to determining that no time period is indicated in the keep-alive control packet, updating the timeout value of the PIT entry based on a predetermined value (Pending Interest Table mechanism 624). Content processing system 618 can receive a Content Object in response to the Interest (communication mechanism 620) and remove the PIT entry corresponding to the name for the Interest (Pending Interest Table mechanism 624).

Content processing system 618 can also include instructions for receiving a predetermined number for entries in the PIT for a name prefix, where the name prefix comprises one or more name components of a hierarchically structured variable length identifier (HSVLI) (congestion mitigation mechanism 626). Content processing system 618 can include instructions for, responsive to determining that the predetermined number of entries for the name prefix has been reached (congestion mitigation mechanism 626), timing out additional PIT entries with the same name prefix (Pending Interest Table mechanism 624).

Content processing system 618 can further include instructions for generating, by a content producing node, a keep-alive control packet which indicates a name for an Interest message, an indicator to keep a PIT entry corresponding to the name alive, and a time period for which to keep the PIT entry alive (keep alive control packet mechanism 620). Content processing system 618 can include instructions for transmitting the keep-alive control packet to an intermediate node (communication mechanism 620). Content processing system 618 can include instructions for generating a Content Object in response to the Interest (content generation mechanism 628) and transmitting the Content Object to another node (communication mechanism 624).

Content processing system 618 can also include instructions for computing a hashcash value and including the computed hashcash value in the keep-alive control packet, where the hashcash computation becomes progressively more complex each time the computation is performed (congestion mitigation mechanism 626). Content processing system 618 can also include instructions for allowing a virtual connection provided by an ISP between the content producing node and a content requesting node to be maintained based on the keep-alive control packet (congestion mitigation mechanism 626).

Content processing system 618 can further include instructions for receiving a predetermined number of tokens from an upstream node, where a token corresponds to a time period for which to keep alive a PIT entry in the content producing node (congestion mitigation mechanism 626). Content processing system 618 can include instructions for consuming a token in exchange for generating the keep-alive control packet, where the time period for which to keep the PIT entry alive is the time period corresponding to the token (congestion mitigation mechanism 626). Content processing system 618 can include instructions for removing a token based on negative behavior of the content producing node (congestion mitigation mechanism 626).

Data 630 can include any data that is required as input or that is generated as output by the methods and/or processes described in this disclosure. Specifically, data 630 can store at least: a packet that corresponds to an Interest message; a name for the Interest; a name for the Interest that is a hierarchically structured variable length identifier (HSVLI) which comprises contiguous name components ordered from a most general level to a most specific level; a name prefix, where the name prefix comprises one or more name components of an HSVLI; an entry in a Pending Interest Table (PIT); a keep-alive control packet which indicates a name for an Interest message, an indicator to keep alive the PIT entry, and a time period for which to keep the PIT entry alive; a timeout value of the PIT entry; one or more interfaces in the PIT entry from which the Interest message is received; a predetermined time period; a predetermined time period that can be dynamically adjusted by routers based on network conditions; a packet that corresponds to a Content Object; a predetermined number for entries in the PIT for a name prefix; a hashcash value whose computation becomes progressively more complex each time the computation is performed; a predetermined number of tokens, where a token corresponds to a time period for which to keep alive a PIT entry; information relating to reputation of a content producing device; and information relating to historical or negative behavior of the content producing device.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for forwarding packets, the method comprising:
  receiving, by an intermediate node, a keep-alive control packet which indicates a name for an Interest message, a field which indicates that an entry in a Pending Interest Table and corresponding to the name is to be kept alive, and a time period for which the entry is to be kept alive;
  determining whether the keep-alive control packet corresponds to the entry in the Pending Interest Table based on the name;
  responsive to determining that the keep-alive control packet corresponds to the entry, updating a timeout value of the entry based on the time period indicated in the keep-alive control packet; and
  responsive to determining one or more interfaces specified in the entry from which the Interest message is received, forwarding the keep-alive control packet to the one or more interfaces,
  thereby facilitating the intermediate node and other intermediate nodes associated with the one or more interfaces to handle a potential timeout event by refraining from re-transmitting the Interest message based on the keep-alive control packet.

2. The method of claim 1, further comprising:
  responsive to determining that no time period is indicated in the keep-alive control packet, updating the timeout value of the entry based on one or more of:
    a predetermined value; and
    a predetermined value which is dynamically adjusted by routers based on network conditions.

3. The method of claim 1, further comprising:
  receiving a Content Object in response to the Interest; and
  removing from the Pending Interest Table the entry corresponding to the name for the Interest.

4. The method of claim 1, wherein determining whether the keep-alive control packet corresponds to the entry is further based on a matching criteria, and wherein the keep-alive control packet further indicates that the matching criteria is one or more of:
  a key identifier associated with a content producing node;
  a hash value of a Content Object corresponding to the Interest; and
  a summary of the Interest.

5. The method of claim 1, further comprising:
receiving a predetermined number for entries in the Pending Interest Table for a name prefix, wherein the name prefix comprises one or more name components of a hierarchically structured variable length identifier; and
responsive to determining that the predetermined number of entries for the name prefix has been reached, timing out additional entries in the Pending Interest Table with the same name prefix.

6. A computer-implemented method for forwarding packets, the method comprising:
generating, by a content producing node, a keep-alive control packet which indicates a name for an Interest message, a field which indicates that an entry in a Pending Interest Table and corresponding to the name is to be kept alive, and a time period for which the entry is to be kept alive; and
transmitting the keep-alive control packet to an intermediate node, which causes the intermediate node to:
update a timeout value of the entry in a Pending Interest Table of the intermediate node based on the time period indicated in the keep-alive control packet; and
forward the keep-alive control packet to one or more interfaces specified in the entry from which the Interest message is received,
thereby facilitating the intermediate node and other intermediate nodes associated with the one or more interfaces to handle a potential timeout event by refraining from re-transmitting the Interest message based on the keep-alive control packet.

7. The method of claim 6, wherein the keep-alive control packet further indicates one or more of:
a key identifier associated with the content producing node;
a hash value of a Content Object corresponding to the Interest; and
a summary of the Interest message.

8. The method of claim 6, further comprising:
generating a Content Object in response to the Interest.

9. The method of claim 6, further comprising:
computing a hashcash value; and
including the computed hashcash value in the keep-alive control packet, wherein the hashcash computation becomes progressively more complex each time the computation is performed.

10. The method of claim 6, further comprising:
allowing a virtual connection provided by an Internet Service Provider between the content producing node and a content requesting node to be maintained based on the keep-alive control packet.

11. The method of claim 6, further comprising:
receiving a predetermined number of tokens from an upstream node, wherein a token corresponds to a time period for which to keep alive an entry in a Pending Interest Table of the content producing node; and
consuming a token in exchange for generating the keep-alive control packet, wherein the time period indicated in the keep-alive control packet is the time period corresponding to the token.

12. The method of claim 11, wherein receiving a predetermined number of tokens is based on one or more of:
purchase of one or more tokens by the content producing node from an Internet Service Provider;
reputation of the content producing node;
historical behavior of the content producing node; and
any other technique.

13. The method of claim 11, further comprising:
removing a token based on negative behavior of the content producing node.

14. The method of claim 13, wherein the negative behavior includes abuse of the upstream node.

15. A computer system for facilitating forwarding of packets, the system comprising:
a processor; and
a storage device storing instructions that when executed by the processor cause the processor to perform a method, the method comprising:
receiving, by an intermediate node, a keep-alive control packet which indicates a name for an Interest message, a field which indicates that an entry in a Pending Interest Table and corresponding to the name is to be kept alive, and a time period for which the entry is to be kept alive;
determining whether the keep-alive control packet corresponds to the entry in the Pending Interest Table based on the name;
responsive to determining that the keep-alive control packet corresponds to the entry, updating a timeout value of the entry based on the time period indicated in the keep-alive control packet; and
responsive to determining one or more interfaces specified in the entry from which the Interest message is received, forwarding the keep-alive control packet to the one or more interfaces,
thereby facilitating the intermediate node and other intermediate nodes associated with the one or more interfaces to handle a potential timeout event by refraining from re-transmitting the Interest message based on the keep-alive control packet.

16. The computer system of claim 15, wherein the method further comprises:
responsive to determining that no time period is indicated in the keep-alive control packet, updating the timeout value of the entry based on one or more of:
a predetermined value; and
a predetermined value which is dynamically adjusted by routers based on network conditions.

17. The computer system of claim 15, wherein the method further comprises:
receiving a Content Object in response to the Interest; and
removing from the Pending Interest Table the entry corresponding to the name for the Interest.

18. The computer system of claim 15, wherein determining whether the keep-alive control packet corresponds to the entry is further based on a matching criteria, and wherein the keep-alive control packet further indicates that the matching criteria is one or more of:
a key identifier associated with a content producing node;
a hash value of a Content Object corresponding to the Interest; and
a summary of the Interest.

19. The computer system of claim 15, wherein the method further comprises:
receiving a predetermined number for entries in the Pending Interest Table for a name prefix, wherein the name prefix comprises one or more name components of a hierarchically structured variable length identifier; and
responsive to determining that the predetermined number of entries for the name prefix has been reached, timing out additional entries in the Pending Interest Table with the same name prefix.

20. A computer system for facilitating forwarding of packets, the system comprising:
- a processor; and
- a storage device storing instructions that when executed by the processor cause the processor to perform a method, the method comprising:
  - generating, by a content producing node, a keep-alive control packet which indicates a name for an Interest message, a field which indicates that an entry in a Pending Interest Table and corresponding to the name is to be kept alive, and a time period for which the entry is to be kept alive; and
  - transmitting the keep-alive control packet to an intermediate node, which causes the intermediate node to:
    - update a timeout value of the entry in a Pending Interest Table of the intermediate node based on the time period indicated in the keep-alive control packet; and
    - forward the keep-alive control packet to one or more interfaces specified in the entry from which the Interest message is received,
    - thereby facilitating the intermediate node and other intermediate nodes associated with the one or more interfaces to handle a potential timeout event by refraining from re-transmitting the Interest message based on the keep-alive control packet.

21. The computer system of claim 20, wherein the keep-alive control packet further indicates one or more of:
- a key identifier associated with the content producing node;
- a hash value of a Content Object corresponding to the Interest; and
- a summary of the Interest message.

22. The computer system of claim 20, wherein the method further comprises:
- generating a Content Object in response to the Interest.

23. The computer system of claim 20, wherein the method further comprises:
- computing a hashcash value; and
- including the computed hashcash value in the keep-alive control packet, wherein the hashcash computation becomes progressively more complex each time the computation is performed.

24. The computer system of claim 20, wherein the method further comprises:
- allowing a virtual connection provided by an Internet Service Provider between the content producing node and a content requesting node to be maintained based on the keep-alive control packet.

25. The computer system of claim 20, wherein the method further comprises:
- receiving a predetermined number of tokens from an upstream node, wherein a token corresponds to a time period for which to keep alive an entry in a Pending Interest Table of the content producing node;
- consuming a token in exchange for generating the keep-alive control packet, wherein the time period indicated in the keep-alive control packet is the time period corresponding to the token; and
- removing a token based on negative behavior of the content producing node.

* * * * *